July 21, 1964 R. H. KELLER 3,141,752
LUBRICATION OF GLASS MOLDS
Filed May 3, 1960 5 Sheets-Sheet 1

INVENTOR.
ROBERT H. KELLER
BY J. R. NELSON &
D. T. INNIS
ATTORNEYS

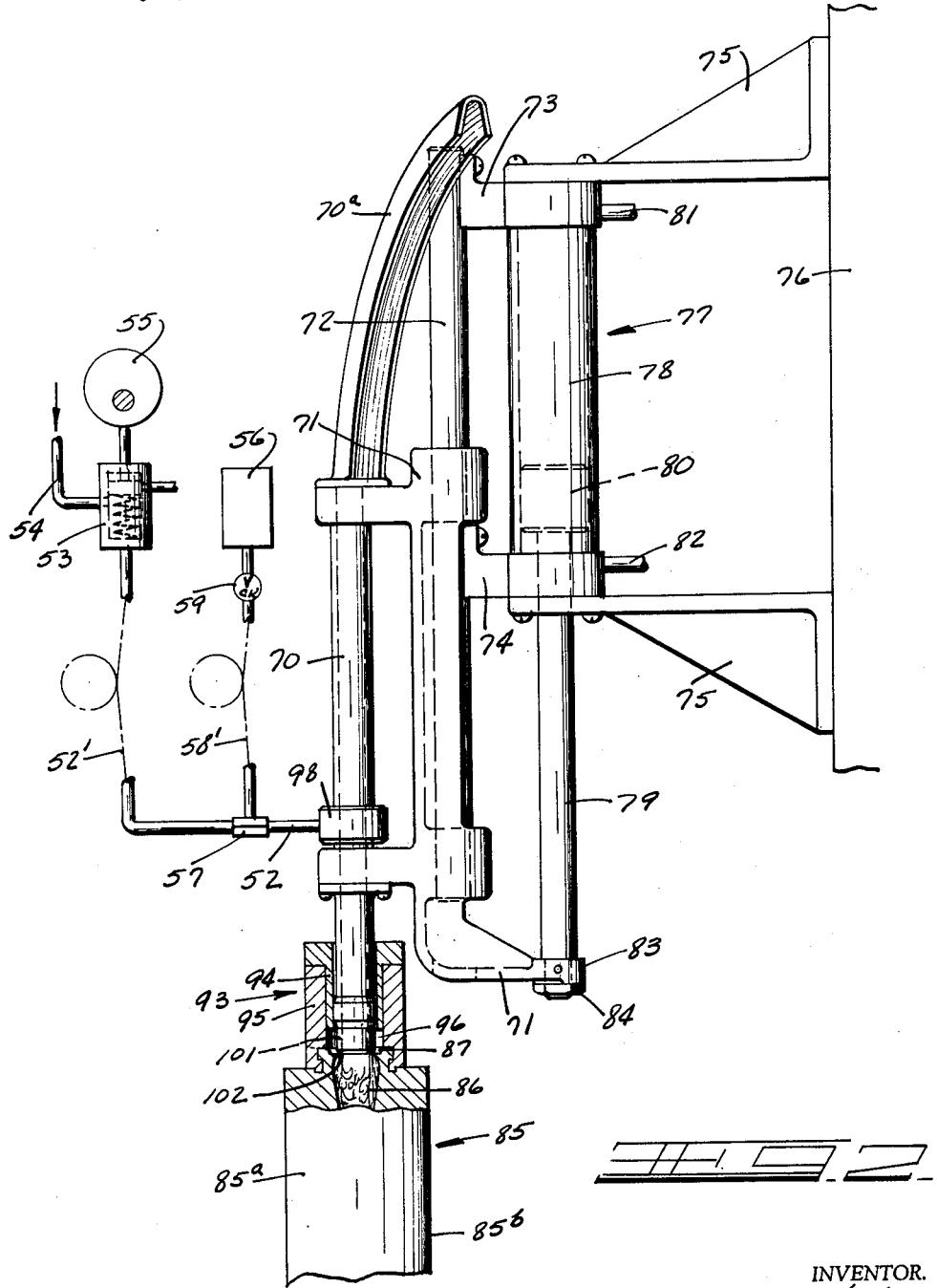

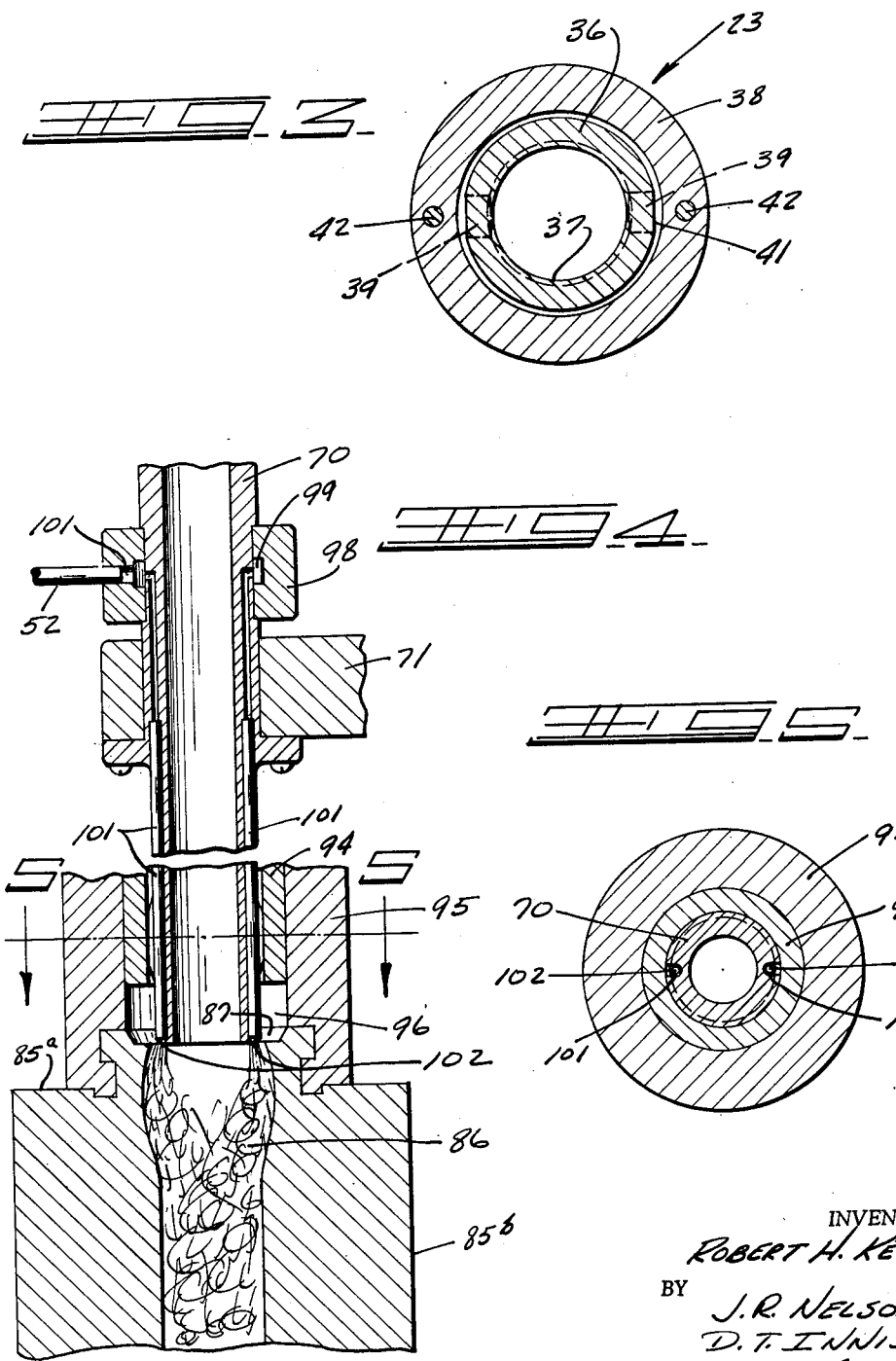

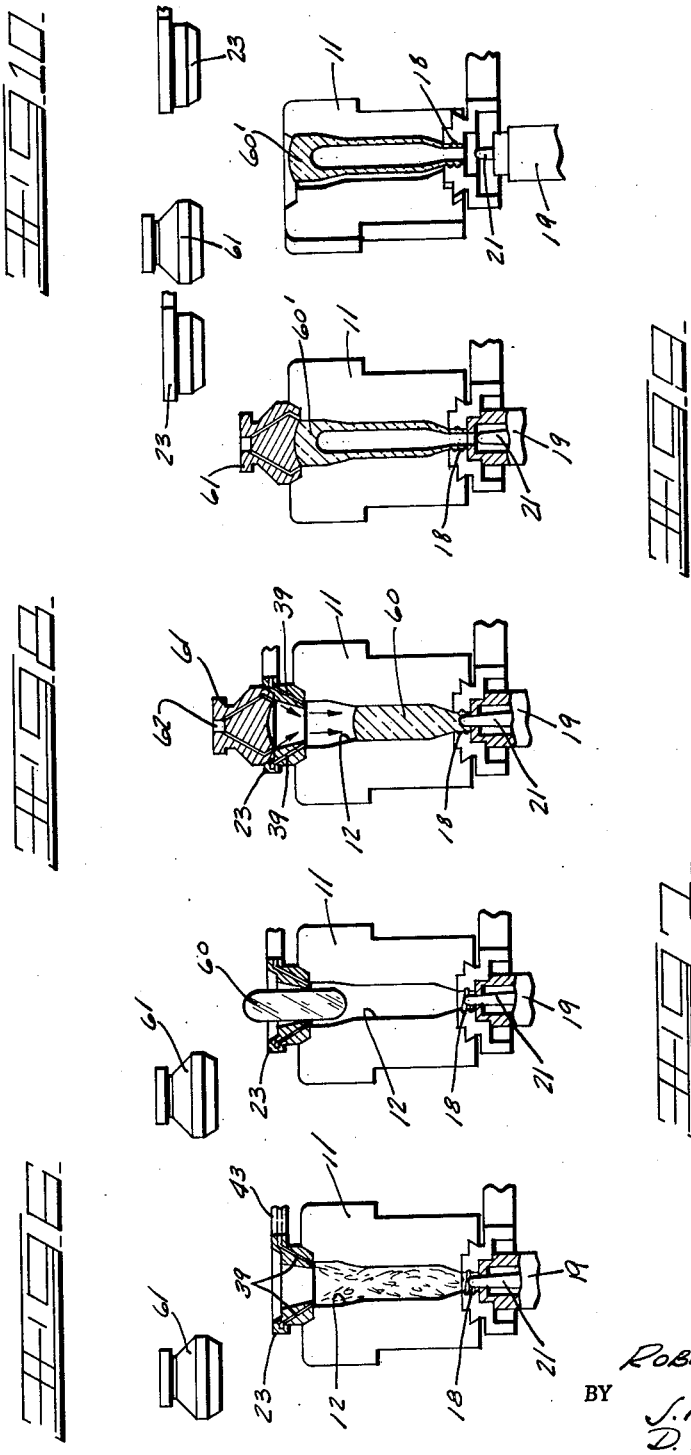

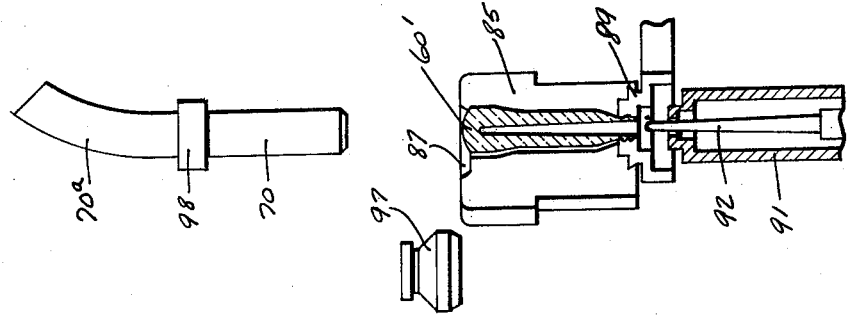
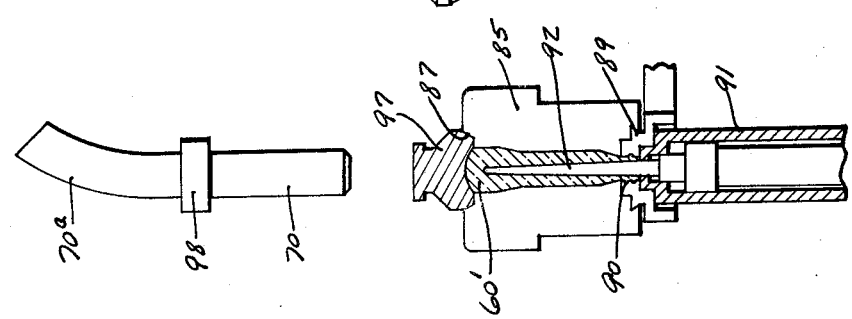
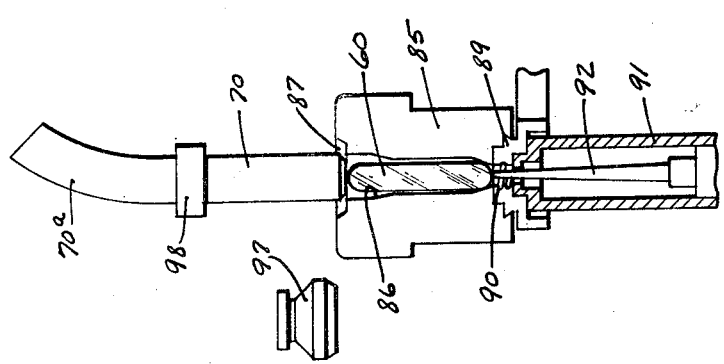
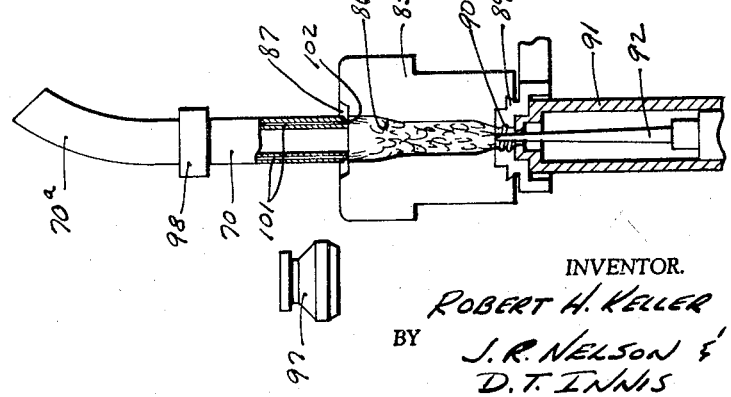

United States Patent Office 3,141,752
Patented July 21, 1964

3,141,752
LUBRICATION OF GLASS MOLDS
Robert H. Keller, Toledo, Ohio, assignor to Owens-Illinois Glass Company, a corporation of Ohio
Filed May 3, 1960, Ser. No. 26,452
2 Claims. (Cl. 65—25)

The present invention relates to the lubricating of glass molds in machine manufacture of glass articles, and, more particularly, to method and apparatus by which molds are lubricated by spray of an atomized lubricant through nozzles and into the mold cavity just prior to entry of a charge of molten glass fed to the mold through the funnel.

In operation of machines in the manufacture of glass articles, such as containers, the molten glass is supplied in gobs, as mold charges, from a feeder of a glass furnace. The gobs are conveyed by chutes and loaded into a mold. The mold has a forming cavity that is disposed with its axis vertical, and an access opening in the upper end of the mold permits loading this gob by continuous conveyance from the point where it was formed and into the cavity. The actual loading is performed through a funnel that is aligned on the mold opening and which receives the formed gob in transit from the delivery chute. In the manufacture of glass containers, a neck is formed on the glass article, called a parison, that is shaped in this mold. This is done by use of a mold, called neck rings, that is placed adjacent the mold for the parison, which is called a blank mold, and the two cavities (the neck rings and blank mold) are contiguous so that the neck of the container is formed on the parison article molded from the gob. After the mentioned mold combination is charged with the glass gob, the parison article is formed therein by one of two basic processes. In the blow-and-blow process, the parison is formed after loading the gob and closing the mold opening by a baffle, whereupon the force of differential air pressure shapes the gob in the mold. The press-and-blow process forms the parison by the positive pressing force of a plunger inserted into the mold cavity after loading the gob and closing the mold opening. Either of these mentioned processes involves a two-stage manufacture in which the formed parison article is then transferred to a second mold, a blow mold, and formed to final shape by blowing technique.

A press process is also used in which certain glass articles, including glass containers, are formed by loading the gob, as mentioned, to a press mold, and pressing the gob to shape of the article by inserting a plunger into the mold cavity. This is a single stage manufacture in which the final shape of the article is formed in the press mold.

As a succession of the articles are formed in the mold of these processes, the walls of the mold cavity and the plungers, and, where employed, the neck rings, need periodic lubrication to improve gob loading and to prevent certain flaws from appearing in the molded glass, such as tears caused by glass sticking on the metal walls of the molds or plunger, "black spots" on the molded glass surface, checks in the finish, and others. For some time, mold lubricants of various types have been applied to the various parts of the mold assembly that contact the glass by hand swabbing them with mold "dope" or spraying them with the "dope" by periodically bringing a separate spray unit to the proximity of these parts on the machine. Either of these techniques has undesired features in that the hand swabbing, aside from being a hazardous task for an operator, requires application of the lubricant at a time when the cycle of the mechanism of the machine permits. This is usually well in advance in the machine cycle of the time the lubricant is most needed, and is often a hit-and-miss application. Hand application results in intentional over-application of the "dope" to cut down on the frequency of swabbing the mold parts. This causes "dirty" ware due to the excess, and creates a smoke hazard in the work area. Mechanized, independent spray units, on the other hand, overly complicate the cycle of the machine forming mechanism, because they require that the mold parts to be lubricated must be made accessible for insertion of the spray nozzle, time allowed for spraying, and removal of the spray nozzle before the mold mechanism is cleared for beginning the forming cycle. Here again, delay is often involved in the cycle, or else a certain amount of time elapses between application of the lubricant in the mold cavity and the loading of the glass gob. Since added moving parts are involved, there exists a hazard of interference between the separate nozzles and the mold parts, should the former malfunction in cycle with the latter. Also, the problem of extra maintenance of these separate parts is presented.

Fixed lubricant sprays have also been used where the spray equipment is stationary, and the lubricant sprayed at the mold parts when the mold assembly is opened and accessible. However, in these devices, uniformity of application of lubricant in the areas where it is needed is not obtained with regularity. The lubricant spray must be transmitted a distance to the mold part and through the cooling wind being used in the area of the mold parts on the machine.

The present invention has as one of its objects the application of lubricant to these parts of the mold assembly by spraying by the funnel just prior to entry of the glass gob into the mold cavity.

Furthermore, it is another important object of the invention to provide a lubricant in atomized state into a mold cavity to supply a mist or gaseous dispersion of the lubricant directionally applied to a definite wall area in the cavity at the time of loading the glass gob therein.

Another object of the invention is to provide a novel lubricating system for molds that is adaptable to various forms of machines presently in use, and that is self-operating without the need for further controls than those available in performing the normal machine cycle.

A further object of the invention is to provide a mold lubricating method and system that is simple, easily maintained, economical, that provides consistent lubrication to the molding parts in the areas where desired, and operates automatically in the cyclical operation of the machine.

Other objects and advantages of the present invention will become apparent to those skilled in the art from the following detailed description, taken in conjunction with the annexed sheets of drawings, on which are presented for purposes of illustration only, two forms of the invention as preferred embodiments of the invention.

On the drawings:

FIG. 1 is a sectional elevational view, in part schematic, showing the invention as applied in use at the blank mold station on a machine employing a short funnel, as the Hartford-Empire IS (Individual Section) machine, illustrated for operation in forming a narrow neck parison in the blow-and-blow process. The drawing shows the blank mold cavity neck mold cavity, and plunger receiving lubricant according to the procedures hereinafter explained.

FIG. 2 is an elevational view, partly in section and in part schematic, showing the invention being employed on a different form of machine for manufacture of glass containers, and which utilizes a long funnel for loading the blank mold cavity with a charge of molten glass.

This illustrates a machine for operation in forming a parison in the press-and-blow process.

FIG. 3 is a sectional plan view, taken along line 3—3 on FIG. 1.

FIG. 4 is an enlarged sectional view of the long funnel and blank mold apparatus of the form of the invention shown on FIG. 2.

FIG. 5 is a sectional plan view, taken along line 5—5 on FIG. 4.

Figure 1:
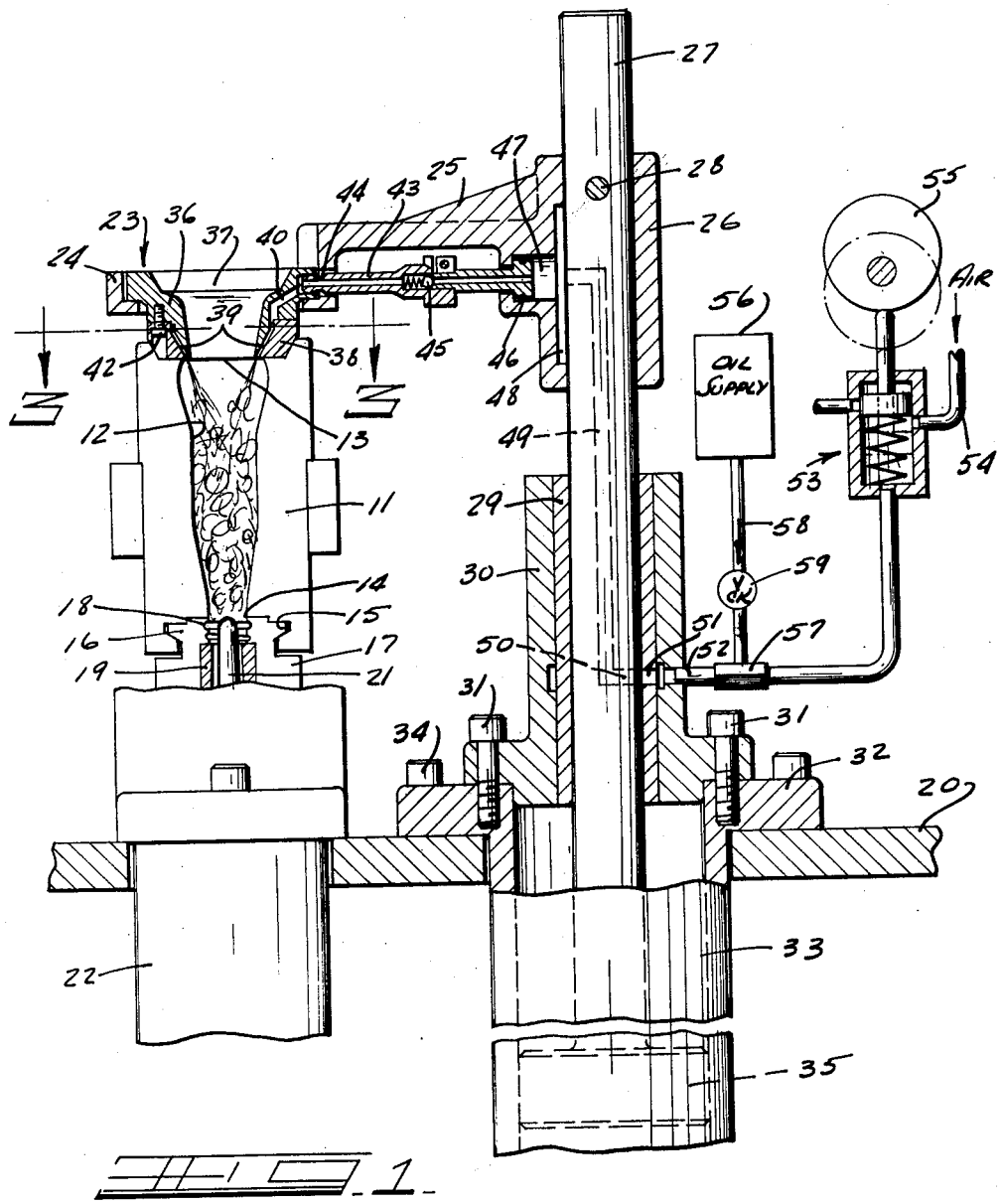

FIGS. 6–10 schematically illustrate, in a functional diagram, the steps of the method of the invention as applied to a blow-and-blow machine.

FIGS. 11–14 schematically illustrate, in a functional diagram, the steps of the method of the invention as applied to a press-and-blow machine.

In the operation of glass forming machines, as the types outlined above, those having their molds charged with molten glass in gob form employ a loading guide or funnel that is brought in the path of the gob and in communication with an opening in the mold connected to the mold cavity. Therefore, under the general description of the method of the present invention, the mold to be loaded, as the blank mold, is brought to a position for loading such that its opening is disposed upright. The funnel is thus placed over this opening so that glass it will receive will be guided into the mold cavity, and, with the parts thus arranged, a mold lubricant is sprayed so that it emits from the lower end of the funnel and into the underlying cavity so as to fill the mold cavity with a mist of the lubricant.

In one form, the lubricant is applied for treating the mold walls by spraying from nozzles disposed in a plane parallel with the bottom end of the funnel in an atomized state. This lubricant may take various forms, such as an oil or liquid, a dispersion of particles in a liquid, varying viscosity fluids, or other forms as may be found acceptable by those in the trade. The lubricant material may be made to atomized state at the time of use by feeding it in desired measured or metered quantities to a fluid system connected with the nozzles, and a pressure media or vehicle, such as a pressurized source of fluid, for example, air, that is connected to the system. The pressure media atomizes the lubricant material while conveying it and causing its emission from the nozzles so that it is sprayed into the cavity as a mist, and the nozzles are directed to apply the mist to a definite mold wall area. The lubricant material may be measured and interposed in the fluid system between the pressure source and the nozzles by a metering device, as will be explained later. This metering device may be one of many presently available that will operate automatically. The pressure media may be controlled so that it is applied automatically and sequentially. This control is best suited to be integrated with the machine control that operates the forming cycle so that the pressure media is applied to the fluid system for a short duration in sequence with bringing the funnel into position over the mold for loading the latter. By this manner, supplying the lubricant into the mold cavity is completed just prior to entry of the glass gob into the mold. Just as the mold cavity is treated with lubricant, the timing is such that a glass gob is conveyed by the delivery chute to the funnel and loaded to the mold cavity, whereupon, the mold opening is closed.

A means for closing the mold opening is by bringing a baffle to seat on the opening. In immediate succession, the glass charge in the mold is then formed by usual manipulations to the shape of a parison. Under one procedure, this is done by introducing a press plunger through the neck rings located at the opposite or lower end of the mold cavity and into the mold cavity to press the parison article in the mold.

Another procedure would be to seat a settle-blow baffle on the funnel and thereby close the mold opening and apply settle blow air through the funnel to force the glass charge around the plunger and into the neck rings at the opposite or lower end of the mold cavity. After settle blow, the baffle and funnel are removed and the mold opening is then again closed by seating the baffle on the mold opennig, whereupon, blowing air is introduced into the cavity through the neck rings to blow-form the parison article in the mold.

By still another procedure, the funnel is moved from the mold opening and a plunger is introduced through that same opening into the mold cavity to press either a final form of the glass article or press a parison article in the mold. In this latter case, the neck rings are adjacent this upper or loading opening of the mold.

One unique advantage of the present method is the loading of the glass gob into a mist of the atomized lubricant present in the treated mold cavity, and thereby obtaining the maximum lubricating effect between the glass and the molding parts.

Referring to the drawings, a blank mold assembly of a glass forming machine is shown on FIG. 1. A split blank mold is comprised of mold halves 11, one of which is shown, mounted on means (not shown) for moving them toward and away from juxtaposed relationship so that, when closed, the mold defines a cavity 12. The cavity has an upper end opening 13 and a lower end opening 14. Below the opening 14 is an annular recessed guide 15 that matches an annular flange 16 of a split neck ring. The neck ring is comprised of halves 17, one of which is shown, mounted on a carriage means (not shown) operable for moving them toward and away from juxtaposed relationship and movable together between the blank mold position and a spaced blow mold position (not shown) for transfer of the parison form the blank mold station to the blow molding station. The neck ring halves 17, when closed, define a neck cavity 18. The neck ring halves 17, in closed position, are nested about a thimble 19 that is movable vertically with respect to machine frame 20 at the blank mold station. While the neck ring halves 17 are closed at the blank mold position, the blank mold halves 11 are closed to register on the neck ring by the matching fit of parts 15 and 16. Internally of thimble 19 is a plunger 21 which is movable with respect to the thimble. The plunger and thimble are connected for actuation by the piston of a reciprocating fluid-operated motor 22 attached to the frame 20. After the neck rings are at the blank mold position, the thimble 19 and plunger 21 are extended upwardly, as shown. In this fashion, the blank mold assembly is brought to a loading position.

The upper mold opening 13 has a radially recessed seat which receives a funnel member 23. The novel construction of the funnel member will be described presently. The funnel member 23 is nested in a bracket 24 of an arm 25. The arm 25 includes an integral journal boss 26 fitted on a vertical rod 27 and fastened thereon for movement with the rod by a pin 28; however, vertical adjustment of boss 26 on rod 27 may be provided by clamping the former on the latter. The parts 24–27 thus provide a carriage for the funnel member 23.

The rod 27 is slidably mounted in a vertical bearing 29 held in a cylindrical housing 30. The housing 30 is bolted at studs 31 to form one end of the cylinder 32 of a fluid-operated reciprocating motor 33. The cylinder 32 is fastened to the machine frame 20 by bolts 34. The rod 27 is connected as a piston rod to the piston 35 of motor 33 for vertical movement therewith.

The motor 33 is operated for driving its piston 35 through raising and lowering movement. A helical cam guide (not shown) may be provided with the motor to swing the arm 25 during the raising and lowering movement to transport the funnel 23 between a remote raised position out of line with mold opening 13 to a lowered position in alignment with that opening shown on FIG. 1.

The motor 33 is operated for its reciprocating driving movement by a source of operating fluid under pressure, and controlled from a machine valve (not shown) of the glass forming machine. This machine valve is, by standard practice, operated off the machine timing drum to supply the pressurized operating fluid to the cylinder 32 of the motor, depending on the direction of movement, and in the proper sequence for obtaining the movements above described. The movements of the motor 33 may thus be controlled in a conventional manner as, for example, according to the control on the well-known Hartford-Empire IS (Individual Section) machine, as disclosed in U.S. Patent No. 2,508,890, issued to G. E. Rowe.

Thus, after the blank mold halves 11 are closed, the funnel carriage is operated by its motor 33 to lower the funnel member 23 and place it over the mold end opening 13.

Referring now to FIGS. 1 and 3, the details of construction of the short-funnel embodiment represented by funnel member 23 will be described. Funnel member 23 consists of a two-piece construction concentrically nested together and fastened. The inner piece 36 defines the funnel guide surface 37. The outer piece 38 cooperates to define the nozzles and connecting passages for fluid, as follows. The outer conical surface of inner piece 36 has two or more milled axial slots, as 39, which open as nozzles along the plane at the bottom of the piece 36 and parallel with the bottom end of the funnel itself. The nozzles 39 are directed to apply the spray of lubricant emitted from them toward a definite mold wall area. FIG. 1 illustrates one particular job where lubrication is most desired in the area in the lower part of the cavity 12. Also in the inner piece 36 and overlying these nozzles 39 is a passage 40. At the lower terminal end of passage 40 is an annular groove 41 (FIG. 3) which connects passage 40 with all of the nozzle slots 39. The inner and outer concentric pieces 36 and 38 of the funnel, when assembled, are fastened together by socket head screws 42.

The passage 40 has a fluid-tight socket connection with a conduit member 43 that extends through an opening 44 in the bracket 24 on the carriage arm. The conduit member includes along its fluid passage a one-way ball check valve 45. This check valve 45 prevents blow back of settle blow air into the fluid system for the lubricant, as will be apparent on FIG. 8. The outer enlarged end 46 of the conduit 43 fits in a bore 47 in the boss 26, and this connection is sealed to be fluid-tight. A semi-annular, or nearly so, chamber 48 that is fluid-tight is provided in the boss 26 along one side of the rod 27, and this chamber communicates with the passage of conduit 43 through the bore 47. The chamber 48 also is connected with a fluid passage 49 in the rod 27. The passage 49 includes a radial portion 50 which is constructed to align with a port 51 through bearing 29 and its housing 30 when the funnel 23 is lowered to its mold loading position with respect to the mold end opening 13.

The port 51 has a fluid connection with a fluid line 52 that extends to a valve 53, schematically represented on FIG. 1. This valve is an "on-off" type valve that connects and disconnects the line 52 with a source of fluid, such as air, that is under pressure and connected to the valve at line 54. This pressurized fluid serves as a pressure vehicle for the lubricant. The valve 53 is mechanically operated, such as by cam 55, or may be fluid sequenced, which may be accomplished by the glass forming machine timing mechanism. A lubricant feeder means, represented on FIG. 1 at 56, is connected into the fluid system at line 52 by a T-connection 57 with conduit 58. The conduit 58 has a one-way check valve 59 for flow of lubricant fluid toward line 52 only. One such feeder 56, which has been found to be satisfactory for use and is automatically operable, is a Manzel Oiler, made and sold by the Manzel Division, Houdaille Industries, Inc., Buffalo, New York. This unit may be set to meter a desired quantity of lubricant for a given time interval, or per cycle, under pressure and into the line 52. The timing control, as cam 55, may be cycled with the machine so that valve 53 is intermittently opened to connect the fluid pressure at line 54 to line 52 and the system. The lubricant metered by the device 56 into line 52 will be picked-up by the pressure vehicle and conducted through the fluid passage of 51, 50, 49, 48, 47, 43, 40, 41, and 39. During this transit, the pressure vehicle will atomize the lubricant to form a dispersion of it in the gaseous medium. This atomized state of the lubricant will emit from the nozzles 39 to form a mist, and this mist form of the lubricant will thus be deposited in the mold cavity 12 to treat the mold parts exposed. The duration of application of the lubricant may be as needed to provide sufficient lubricant in the mold cavity. This duration may be controlled by the cam device 55. Normally, the emission of lubricant will cease just before the glass gob is loaded through the funnel surface 37. It may, however, in some instances, be continued during gob loading, so that the lubricating and gob loading steps overlap, or nearly so.

Referring to FIGS. 6-10, the sequence of operation of the apparatus on a blow-and-blow type machine, as illustrated in the embodiment of FIG. 1, in performing the method of the invention is as follows. The funnel 23 is placed over the opening of the mold 11 that is in loading position ready to receive a charge of glass. The spraying of lubricant is applied through the use of the funnel, described above, as shown on FIG. 6. The glass gob 60 is then loaded through the funnel into the treated mold cavity (FIG. 7). Next, the baffle 61 is brought onto the top end of funnel 23, and settle blow air is blown into the cavity through passage 62 (FIG. 8). Next, counter blow air is forced through the plunger opening in the gob to form it to a parison 60' (FIG. 9). The mold 11 is then opened, and the parison 60' is ready for transfer (FIG. 10).

Referring to FIGS. 2, 4, and 5, the second embodiment of the invention will now be described. This embodiment, by contrast, may be called the long-funnel embodiment of apparatus of the invention. This funnel, referred to hereinafter by reference numeral 70, is mounted on a vertically reciprocating carriage 71. The funnel carries an attached deflector 70a that fits at the upper end of the funnel. The carriage 71 is journaled near its ends on a vertical slide rod 72 that is held by brackets 73 and 74. These brackets are fastened to standards 75 on the machine frame 76. A fluid-operated cylinder motor 77 is also mounted on standards 75. The cylinder 78 and piston rod 79 are thus disposed parallel to slide rod 72, and the piston 80 is driven in a vertical direction by supplying pressurized fluid to either end port 81 or 82 of the cylinder 78. This actuation is controlled from the machine timing mechanism (not shown). The lower end of carriage 71 has a boss 83 that is attached to the lower end of piston rod 79 by a threaded nut 84.

Below the funnel 70 is the split blank mold 85 of the machine assembly, comprised of mold halves 85a and 85b. These mold halves are mounted on means (not shown) for moving them toward and away from juxtaposed relationship, so that, when closed, the mold defines a cavity 86. The cavity has an upper end opening 87 and an opposed lower end opening 88 (FIG. 11). Below the opening 88 is an annular recess that forms a matching guide for annular flanges of a split neck ring 89. The neck ring is comprised of halves, one of which is shown mounted on a carriage means (not shown) operable for moving them toward and away from juxtaposed relationship, and movable together between the blank mold position and a spaced blow mold position (not shown) for transfer of a formed parison from the blank mold to a blow mold. The neck ring halves, when closed, define a neck cavity 90. The neck rings close about a plunger housing 91 that is mounted on the machine frame at the blank mold station. The neck ring halves are thus closed and registered with respect to the plunger, and the blank mold halves are closed and registered on the neck rings so that the cavities 90 and 86 are contiguous for forming a parison article. The blank mold assembly is thus in a loading position. Internally of the plunger housing 91 is a pressing plunger 92 which is attached to the piston of a reciprocating motor housed below the plunger in the housing 91.

Referring again to FIGS. 2 and 4, the upper end of the mold 85 is closed on a two-piece guide supported by means (not shown) on the machine. The two pieces 94 and 95 of the guide are fitted together concentrically, the inner piece 94 providing a sliding fit with the lower end of the funnel 70. Also, the inner piece 94 provides a space 96 between it and the top of the mold 85. In the cycle of the machine, the funnel is raised after loading the mold with a gob of glass, and a baffle 97 (shown only schematically on FIGS. 11–14) is insertable in that space 96 for closing the upper end opening 87 of the mold.

Referring specifically now to FIGS. 4 and 5, the funnel has the following features. A distribution box 98 is fastened to the exterior of the funnel. The box 98 has an annular chamber 99 about the outer wall of the funnel 70. A port 100 is provided through the box at one point to form a connection with the chamber 99. Axially along the wall of the funnel 70 are plural passages 101 that extend at their upper end from a radial connection with the chamber 99 to the lower end of the funnel, whereat they terminate to form nozzles 102. The nozzles 102 are directed to apply the spray of lubricant toward a definite mold wall area. FIG. 4 illustrates a particular job where this area is near the upper and intermediate part of the cavity 86. FIG. 5 illustrates two nozzles 102 employed; however, more than two such nozzles may be employed, as may be desirable. The passages 101 may be provided by a number of constructions, one such construction being that shown as a pipe section, recessed in the funnel and extending from the nozzles 102 to a continuing drilled passage through an upper portion of the funnel that communicates with the chamber 99 in the distribution box 98. The port 100 of the box 98 has a fluid-tight connection with the conduit 52 that extends to an outlet of valve 53. Since this valve and the fluid circuit now described are similar to parts described under the first embodiment of the invention, the same reference numerals will be employed wherever such similarity exists. Valve 53 connects and disconnects the line 52 with a source of fluid, such as air, that is supplied under pressure and connected to the valve at line 54. The valve may be mechanically operated, such as by cam 55, or may be fluid sequenced, which may be accomplished by the machine timing mechanism. A lubricant feeder device, represented schematically on FIG. 2 at 56, is connected into the fluid system at line 52 by a T-connection 57 through a flexible conduit 58'. The lines 52' and 58' may be, in part, flexible conduits to accommodate the vertical movement of the funnel 70. The pressurized air is supplied intermittently to line 52' by the operation of the valve 53, and lubricant material is metered by the device 56 into the line 58', as previously described. The check valve 59 in line 58' permits flow in one direction to line 52. The lubricant and the pressure vehicle in the line 52 will be fed to the chamber 99 of the distribution box, and, from there, conducted down the plural passages 101 to be emitted at their nozzles 102.

Referring now to FIGS. 11–14, the sequence of operation of the foregoing apparatus on a press-and-blow type machine, as illustrated in the embodiment of FIG. 2, in performing the method of the invention will be described. The mold 85 and neck rings 89 are brought to their loading position, and the funnel 70 is lowered over the opening 87 of the mold. As the mold assumes its loading position, just mentioned, the valve in the fluid system is operated so as to supply pressurized air and lubricant to the distribution box 98, and, thence, emit a spray of the atomized lubricant through the lower nozzles 102 of the funnel. This procedure is shown on FIG. 11. This may be continued until the time of loading the glass gob to the mold cavity, which is shown as being accomplished on FIG. 12. During loading, the glass gob 60 passes through the funnel 70 and into the mold cavity, which has been treated with a mist of the lubricant. The gob, on entry, passes through some of the mist of lubricant in the mold cavity. Next, the funnel 70 is raised, and the baffle 97 is brought into alignment over the top end opening 87 of the mold to close same. The pressing plunger 92 is, in sequence, driven upwardly to shape the glass gob into a parison article 60' (FIG. 13). Thereafter, as shown on FIG. 14, the pressed parison 60' is liberated from the blank mold by opening the latter and the baffle 97 being removed. At this point, the parison is ready for transfer by the neck rings.

In conclusion, it should be mentioned that the invention may be employed with forming machines utilizing a one-piece mold equally as well as with machines that utilize the above-described split mold. Furthermore, the invention may be employed on glass container forming machines operating either "double gob" or "single gob," and regardless of whether they are equipped to make "narrow neck" ware or "wide mouth" ware.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. The method of forming charges of molten glass into articles in a mold, comprising the steps of:
   (1) bringing the mold to loading position and thereby providing a forming cavity for the article, said cavity having an upper opening for loading a charge of glass,
   (2) placing a loading funnel in registry over said opening of the mold for glass loading communication with said cavity,
   (3) introducing a lubricant in a pressurized medium,
   (4) discharging said lubricant and medium into the mold cavity in the form of an atomized mist of the lubricant from a plurality of annularly spaced nozzles at the registered bottom end of the funnel, the nozzles being directed to circumferentially impinge the lubricant on a definite vertical area of the mold wall, and said lubricant discharge creating an atmosphere of said lubricant mist in the mold cavity,
   (5) delivering a charge of molten glass to and through the funnel substantially simultaneously with the discharging of said lubricant while the funnel is in registry with the mold,
   (6) removing the funnel,
   (7) closing the upper end opening of the mold, and
   (8) forming the glass charge to article shape in the lubricated mold.

2. The method of forming charges of molten glass into articles in a mold, comprising the steps of:
   (1) bringing the mold to loading position and thereby providing a forming cavity for the article, said cavity having an upper opening for loading a charge of glass,
   (2) lowering a loading funnel into registry on said opening of the mold such that the funnel and a plurality of annularly spaced nozzles at the bottom end of the funnel are in communication with the mold cavity and said nozzles are located for circumferentially spraying a lubricant onto a definite vertical wall area of the mold cavity,
   (3) injecting a measured quantity of a lubricant material into a pressurized fluid medium,
   (4) connecting the pressurized medium containing the lubricant material to the nozzles immediately after registry of the funnel with the mold opening and for a timed interval during which said lubricant in said pressurized medium is sprayed as an atomized mist of lubricant onto the definite vertical area of the mold wall and into the mold cavity,
(5) delivering a charge of molten glass to and through the funnel substantially simultaneously with the spraying of said lubricant while the funnel is in registry with the mold,
(6) removing the funnel,
(7) closing the open end opening of the mold, and
(8) forming the glass charge to article shape in the lubricant mold.

References Cited in the file of this patent
UNITED STATES PATENTS

| | | |
|---|---|---|
| 1,490,182 | O'Neill | Apr. 15, 1924 |
| 1,755,397 | Hunter | Apr. 22, 1930 |
| 1,761,792 | Jaeger | June 3, 1930 |
| 1,756,493 | Peiler | Apr. 29, 1930 |
| 1,878,942 | Lobb | Sept. 20, 1932 |
| 1,911,119 | Ingle | May 23, 1933 |
| 2,410,422 | Breene et al. | Nov. 5, 1946 |